United States Patent Office 2,861,092
Patented Nov. 18, 1958

2,861,092

S-TRICHLOROMETHYL TETRAALKYLPHOSPHORODIAMIDOTHIOLATES

Richard L. McConnell and Harry W. Coover, Jr., Kingsport, Tenn., assignors to Eastman Kodak Company, Rochester, N. Y., a corporation of New Jersey No Drawing. Application August 22, 1956
Serial No. 605,480

7 Claims. (Cl. 260—461)

This invention relates to new compositions of matter and to their preparation. In one of its aspects, it relates to new organophosphorus compounds which are represented by the general formula:

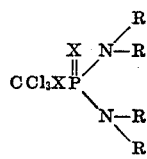

wherein each R is an alkyl group containing 1 to 4 carbon atoms and each may be the same or different group, and X is oxygen or sulfur.

An object of this invention is to prepare new organophosphorus compounds of the general formula as set out above. Another object is to provide a method for the manufacture of said new organophosphorus compounds. Still another object is to provide new and useful organophosphorus compounds which may be utilized in insecticidal compositions. These other objects will be apparent from the description and claims that follow.

A preferred method of producing the compounds of this invention is to react trichloromethanesulfenyl chloride and alkyl esters of tetraalkylphosphorodiamidous acids. The following equation is illustrative:

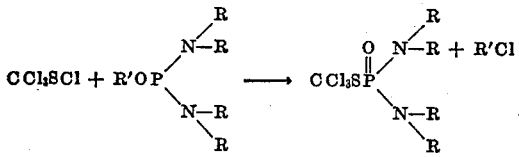

wherein R is as defined above and R' is a lower alkyl group. Trichloromethanesulfenyl chloride may be prepared by known means, such as that given in Beilstein, 3, 135 (63). The alkyl tetraalkylphosphorodiamidite intermediates may be conveniently prepared by the methods described in G. M. Kosolapoff, "Organophosphorus Compounds," 1950, pp. 180 and 278.

Approximately equimolar quantities of the reactants are used and the reaction is usually carried out by the dropwise addition of trichloromethanesulfenyl chloride to the alkyl tetraalkylphosphorodiamidite while the temperature is maintained in the 0° to 25° C. range. Solvents may be used but such are not required. Suitable solvent media are inert solvents such as hydrocarbons or ethers. After the initial exothermic reaction has subsided, the reaction mixture is warmed on a steam bath to remove the byproduct alkyl halide.

The following examples will further illustrate and describe the invention:

*Example 1.—S-trichloromethyl tetramethylphosphorodiamidothiolate*

Ethyl tetramethylphosphorodiamidite (0.2 mole) was placed in a reaction flask equipped with a thermometer, stirrer, condenser, and dropping funnel. While the reaction flask was cooled in an ice bath, trichloromethanesulfenyl chloride (0.2 mole) was added dropwise with stirring at such a rate that the temperature did not rise above about 10–15° C. After the addition was complete, the reaction mixture was allowed to warm up to room temperature. Finally, the ethyl chloride present is removed by warming the reaction flask on a steam bath. The crude product is sufficiently pure for most uses. Attempted distillation at reduced pressure results in considerable decomposition of the product.

*Example 2.—S-trichloromethyl tetraethylphosphorodiamidothiolate*

This product was prepared from ethyl tetraethylphosphorodiamidite (0.2 mole) and trichloromethanesulfenyl chloride (0.2 mole) according to the procedure of Example 1.

*Example 3.—S-trichloromethyl N,N-dibutyl-N',N'-dimethylphosphorodiamidothiolate*

This product was prepared from ethyl N,N-dibutyl-N',N'-dimethylphosphorodiamidite (0.2 mole) and trichloromethanesulfenyl chloride (0.2 mole) according to the procedure of Example 1.

The compounds of the invention are particularly valuable when used as insecticides or when used in insecticidal compositions. They are also useful as intermediates in the synthesis of other organophosphorus compounds. The following example is illustrative of the use of the compounds of the invention as insecticides and is indicative of their marked utility in this regard.

*Example 4.—Use of S-trichloromethyl tetramethylphosphorodiamidothiolate as pesticide*

*Dust application.*—Two grams of S-trichloromethyl tetramethylphosphorodiamidothiolate was mixed intimately with 98 g. of talcum. Five grams of this dust was placed in a Petri dish which contained ten 2-spotted mites. All mites were dead after 24 hours.

*Solution application.*—Two ml. of a 1% solution of S-trichloromethyl tetramethylphosphorodiamidothiolate in acetone was applied to a small piece of filter paper. This filter paper was placed in a Petri dish which contained ten 2-spotted mites. All mites were dead after 24 hours.

*Example 5.—S-trichloromethyl tetrapropylphosphorodiamidothiolate*

This product was prepared from ethyl tetrapropylphosphorodiamidite (0.2 mole) and trichloromethanesulfenyl chloride (0.2 mole) according to the procedure of Example 1.

*Example 6.—S-trichloromethyl N,N-diethyl-N',N'-dipropylphosphorodiamidothiolate*

This product was prepared from ethyl N,N-diethyl-N',N'-dipropylphosphorodiamidite (0.2 mole) and trichloromethanesulfenyl chloride (0.2 mole) according to the procedure of Example 1.

The compounds of Examples 2, 3, 5, and 6 were also tested for insecticidal activity according to the procedure outlined in Example 4 and equally advantageous results were obtained.

Although the invention has been described in considerable detail with particular reference to certain preferred embodiments thereof, variations and modifications can be effected within the spirit and scope of the invention as described hereinabove, and as defined in the appended claims.

We claim:
1. The compounds of the general formula:

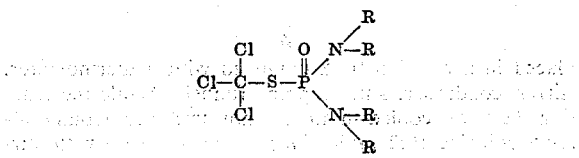

wherein each R is an alkyl group containing 1 to 4 carbon atoms.

2. The process of making the compounds of claim 1 comprising the bringing together of approximately equimolar quantities of trichloromethane sulfenyl chloride and an alkyl tetraalkylphosphorodiamidite, said alkyl radicals containing from 1 to 4 carbon atoms, by gradual addition of the chloride while temperature is maintained in the 0° to 25° C. range.

3. S-trichloromethyl tetramethylphosphorodiamidothiolate.
4. S-trichloromethyl tetraethylphosphorodiamidothiolate.
5. S-trichloromethyl N,N-dibutyl-N',N'-dimethylphosphorodiamidothiolate.
6. S-trichloromethyl tetrapropylphosphorodiamidothiolate.
7. S-trichloromethyl N,N-diethyl-N',N'-dipropylphosphorodiamidothiolate.

References Cited in the file of this patent
UNITED STATES PATENTS 2,765,276   Van Winkle et al. _____ Oct. 2, 1956